June 2, 1953  J. HALLER  2,640,325
HYDRAULIC MOLDING PRESS
Filed Aug. 12, 1950  4 Sheets-Sheet 1

Inventor
John Haller
Barthel & Bugbee
Attorneys

June 2, 1953

J. HALLER 2,640,325

HYDRAULIC MOLDING PRESS

Filed Aug. 12, 1950

Inventor
John Haller
Barthel & Bugbee
Attorneys

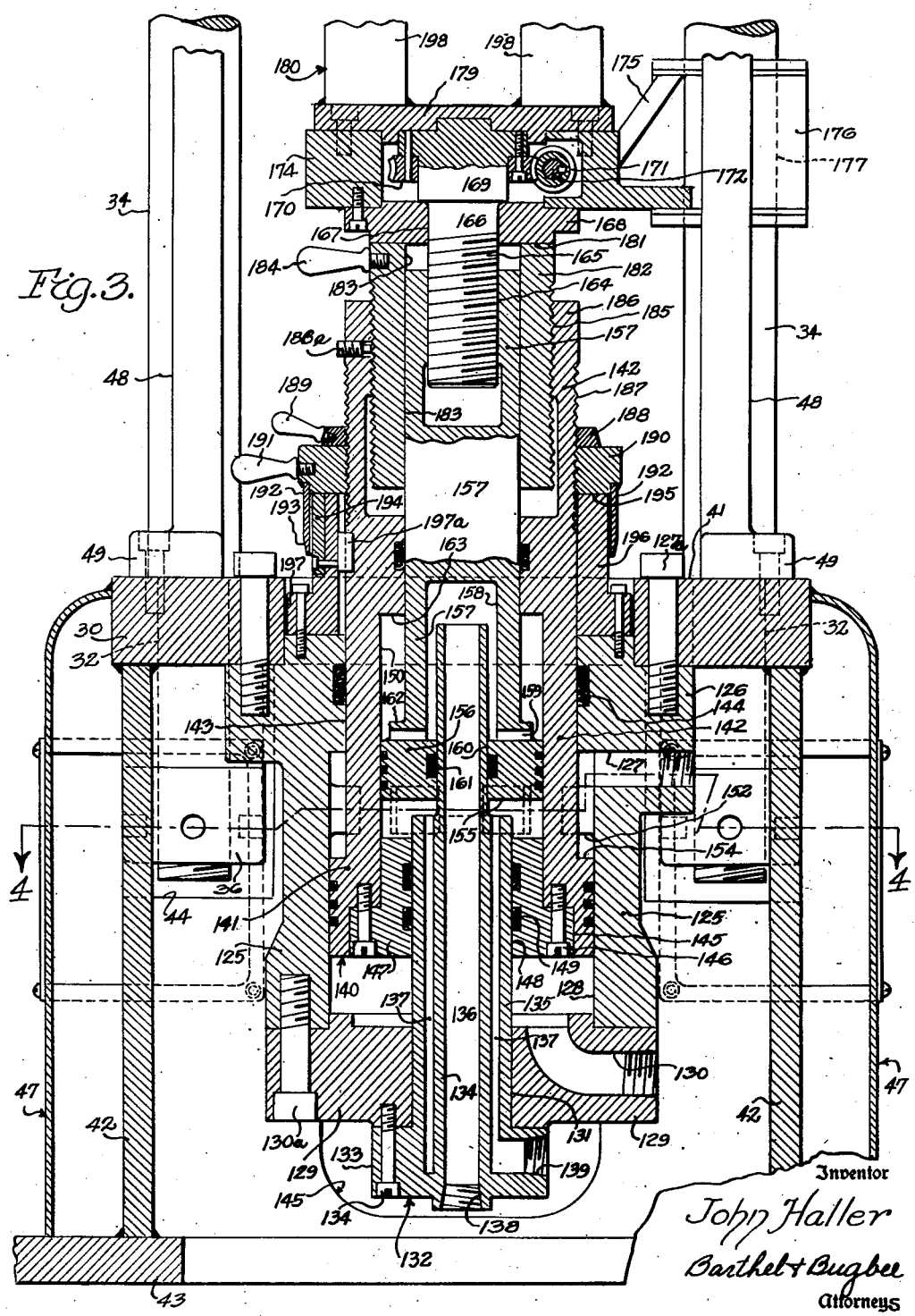

June 2, 1953

J. HALLER 2,640,325

HYDRAULIC MOLDING PRESS

Filed Aug. 12, 1950

Inventor
John Haller
Barthel + Bugbee
Attorneys

Patented June 2, 1953

2,640,325

UNITED STATES PATENT OFFICE 2,640,325

HYDRAULIC MOLDING PRESS

John Haller, Northville, Mich.

Application August 12, 1950, Serial No. 179,017

6 Claims. (Cl. 60—97)

This invention relates to presses and, in particular, to hydraulic presses.

One object of this invention is to provide a hydraulic press which is especially well adapted for operations in which it is necessary to halt the plungers precisely at predetermined locations, such as, for example, in the molding of powdered metal articles to precise dimensions.

Another object is to provide a hydraulic press of the foregoing character in which the motions of the plunger or plungers are limited by purely mechanical stop mechanisms or structures, thereby avoiding errors or accidents resulting from the misfunctioning or non-functioning of electrical or hydraulic stop devices controlled by limit switches.

Another object is to provide a hydraulic press of the foregoing character in which the stop mechanisms are controlled and adjusted by manually operable stop operating means, such as screw and nut mechanisms.

Another object is to provide a hydraulic press of the foregoing character having oppositely movable plungers entering opposite ends of a mold cavity or bore, the distances to which both plungers will advance toward one another being precisely adjustable by mechanical adjusting and stop mechanisms so that the separation of the ends of the molding plungers at their points of nearest approach may be precisely predetermined in order to produce molded workpieces to precise dimensions.

In the drawings:

Figure 3 is a central vertical section through the lower portion of the press shown in Figure 1;

Figure 5 is a horizontal section taken along the line 5—5 in Figure 1;

Figure 6 is a horizontal section taken along the line 6—6 in Figure 1;

Figure 8 is an enlarged fragmentary side elevation of the micrometer stop mechanism for the lower outer plunger shown in the lower portion of Figure 1;

General arrangement

Figure 1:
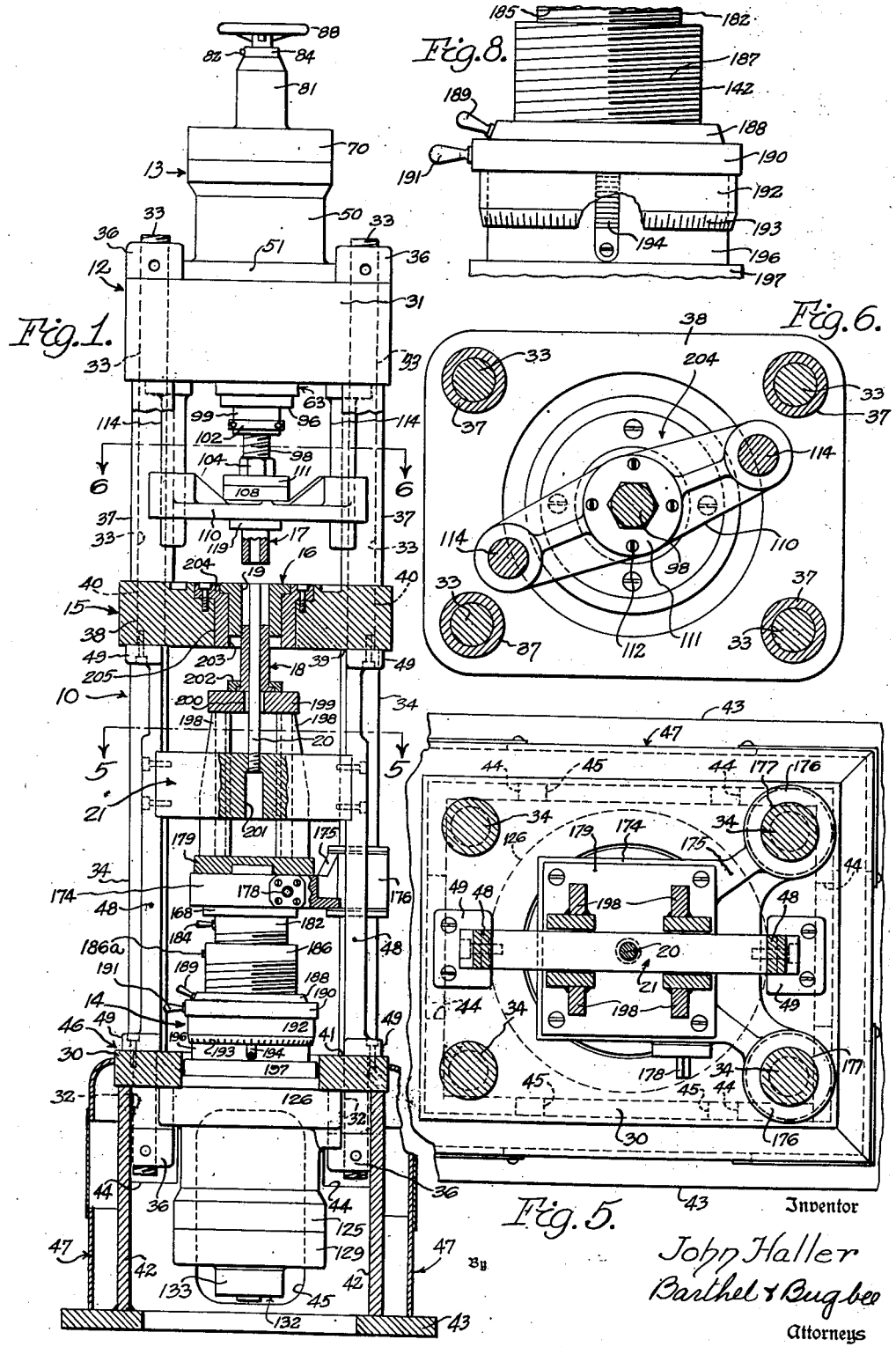
Figure 1 is a side elevation, partly in vertical section, of a hydraulic press according to one form of the present invention.

Hitherto, in the compression molding of articles from powdered material, such as powdered metal articles, it has been found difficult to precisely control the dimensions of the molded workpieces, and at the same time to provide an efficient and dependable press for this purpose. Attempts at controlling the halting of the molding punch or punches at precise locations by the use of electrical or electro-hydraulic devices controlled by limit switches have not been completely successful because of the lack of dependability of such devices and limit switches and the lack of preciseness in their operation. Similar shortcomings are possessed by control systems which mechanically shift the control valves of the hydraulic press in order to halt the punches or which employ sliding sleeves or other adjustable port arrangements for this purpose.

The present invention provides a molding press wherein the punches are caused to halt at precisely positioned locations by means of purely mechanical stop mechanisms and structures so that the punches will always approach one another to a predetermined separation and will then halt. This insures that the molded workpieces will always be of the same dimensions and will not vary in length. It also insures that compression will take place according to the desired compression ratio for the particular piece being molded. These stop mechanisms are operated manually and include screw-actuated devices which are capable of minute manipulation and unchanging adjustment when the stop has been positioned in its desired location. Locking arrangements, such as lock nuts, are provided to prevent accidental shifting of these stops during operation.

Referring to the drawings in detail, Figures 1 to 8 inclusive show a hydraulic press generally designated 10, according to one form of the invention as consisting generally of a frame structure 12 carrying an upper plunger unit 13, a lower plunger unit 14, and an intermediately-located press table unit 15. Associated with the units are a tubular mold or die 16 having upper and lower punches 17 and 18 respectively adapted to enter the opposite ends of the mold or die bore or cavity 19. The punches 17 and 18 are tubular and a core rod 20 projects upward through the lower punch 18 and is held by a core rod bridge or support 21. These elements will subsequently be described in more detail below.

The frame structure 12 consists of a press base 30 and head 31 of approximately rectangular outline and drilled as at 32 and 33 respectively near their four corners to receive the lower and upper ends respectively of strain rods 34. The ends of the strain rods 34 are threaded to receive internally-threaded nuts 36 by which the frame structure 12 is held together. Tubular spacing members 37 are arranged between the press head 31 and the table unit 15, and the strain rods 34 are reduced in diameter immediately below the table 38 of the table unit 15 so as to provide annular shoulders 39 upon which the table 38 rests (Figure 1). The table 38 is bored as at 40 for the passage of the reduced diameter upper portions of the strain rods 34. The lower ends of the strain rods 34 are similarly reduced in diameter at the points where they enter the bores 32 above the base 30 so as to provide annular shoulders 41 at that location. In this manner a rigid frame is provided for supporting the various units of the press.

Figure 4:
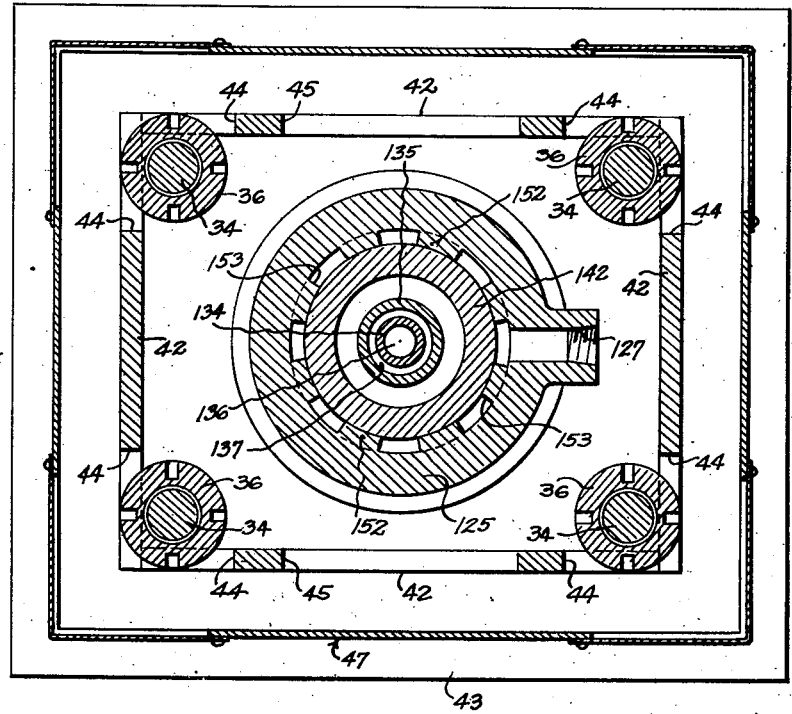
Figure 4 is a horizontal section taken along the line 4—4 of Figure 3.

In order to support the lower plunger unit 14 above the floor level, the bed 30 is supported upon vertical side plates 42 (Figure 1) which at their lower ends are welded or otherwise secured to an open-centered rectangular floor plate 43. The side plates 42 are provided with cutaway portions 44 at their upper corners or provide clearance for the nuts 36 (Figures 1 and 4). Access openings 45 are also provided in two of the side plates 42. The press base 30 and side plates 42 together with the floor plate 43 form a press base structure, generally designated 46. The latter is enclosed by a closure structure, generally designated 47, for the sake of appearance and exclusion of dirt. The bridge structure 21 is bolted or otherwise suitably secured to a pair of uprights 48 located on opposite sides of the press 10 between the strain rods 34 (Figures 1 and 5). The uprights 48 are flanged or enlarged at their upper and lower ends 49 and bolted to the press base 30 and table 38 respectively.

Upper plunger unit construction

The upper plunger unit 13 (Figure 2) includes an upper cylinder 50 having an outwardly extending flange 51 adapted to rest upon shoulders 52 surrounding an opening 53 in the press head 31 and held in place by bolts 54. The lower portion 55 of the cylinder 50 extends down into the opening 53. The cylinder 50 is provided with a bore 56 which at its upper end expands into an enlarged bore 57 separated from the bore 56 by an assemblage of radial shoulder stops 58, resembling bosses, separated from one another by gaps 59 suitable for the passage of fluid. This construction resembles that shown in Figure 4. The lower end of the bore 56 is provided with a counterbore 60 containing an annular packing 61 held in place by a ring or gland 62 bolted to the lower portion 55 of the cylinder 50. The packing 61 engages a plunger generally designated 63 which at its upper end terminates in a piston head 64 having an annular shoulder 65 which is engageable at the lower end of its stroke with the radial stops 58 to limit the downward stroke of the plunger 63.

Figures 2, 7:
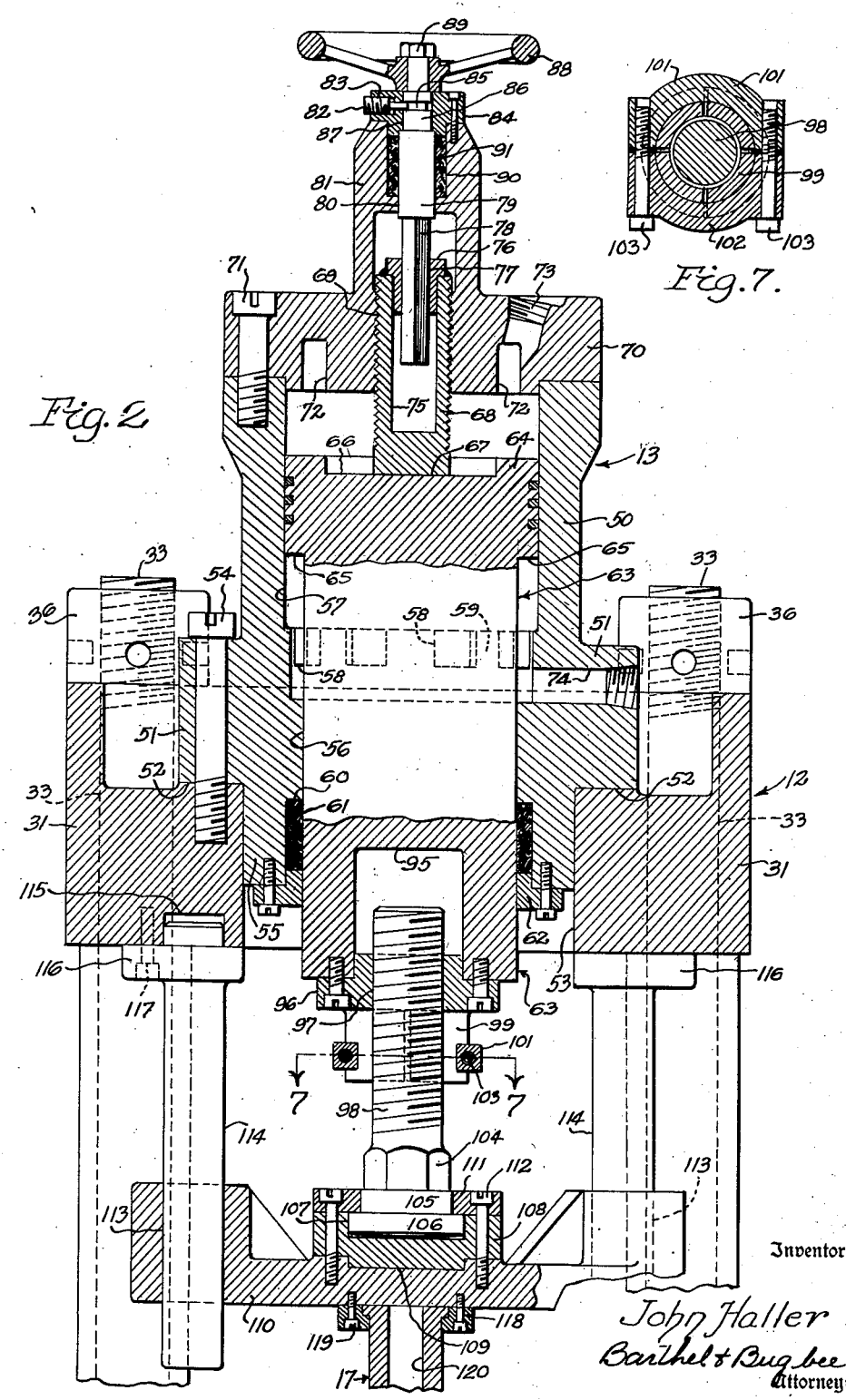
Figure 2 is a central vertical section through the upper portion of the press shown in Figure 1.
Figure 7 is a horizontal section taken along the line 7—7 in Figure 2.

The upper end of the plunger 63 is provided with a countersunk central surface 66 which is engaged by the lower end 67 of a screw stop 68 which is threaded into a central threaded bore 69 in a cylinder head 70 which is bolted as at 71 to the upper end of the cylinder 50 (Figure 2). The cylinder head 70 has an annular fluid passageway 72 therein leading to a threaded port 73 for the admission and discharge of fluid. Similarly, the flanged portion 51 of the cylinder 50 also has a threaded port or passageway 74 leading to the portion of the cylinder bore 57 below the piston head 64, and likewise adapted to be connected to a pressure fluid supply or discharge pipe.

The threaded stop 68 is provided with a central cavity or recess 75 closed at its upper end by a bushing 76 welded or otherwise suitably secured thereto. The bushing 76 is provided with a central hole 77 of square cross-section slidably receiving a square shaft 78 having a portion 79 of circular cross-section rotatably mounted in a bore 80 within an upstanding boss 81 rising from the cylinder head 70. A stud 82 threaded into a radial hole 83 in the circular cap 84 bolted to the upper end of the boss 81 engages a groove 85 in the shaft portion 86 so as to prevent the latter from moving upward or downward. It also serves as a locking screw to clamp the shaft 78 against rotation after it has been adjusted. The shaft portion 86 is rotatably mounted in a bore 87 in the cap 84 and carries a hand wheel 88 secured as at 89 to the upper end of the shaft portion 86. The bore 80 is counterbored as at 90 to receive a packing 91 for preventing leakage around the shaft portion 79.

The lower end of the plunger 63 is provided with a recess or cavity 95 closed at its lower end by a cap 96 bolted thereto and having a threaded bore 97 therein threadedly receiving a screw shaft 98. The screw shaft 98 is prevented from rotation during the operation of the press by a split clamping nut 99 which also threadedly receives the screw shaft 98 and which is integral with and extends downward from the cap 96. A split collar 100 consisting of halves 101 and 102 which are pulled together by bolts 103 (Figure 7) serves to compress the split nut 99 and clamp the screw shaft 98 in its adjusted position.

The screw shaft 98 is provided with a polygonal portion 104 immediately below its threaded portion for engagement by a suitable wrench in order to rotate the screw shaft 98 and make the necessary adjustment thereof. Below the polygonal portion 104 the screw shaft 98 is provided with a stepped portion 105 below which is a circular head 106. The head 106 is seated in a cylindrical socket 107 in a block 108, the lower end of which is seated in a recess 109 in a cross head 110 (Figure 2). The socket 107 is closed by a closure ring 111 which is bolted to the cross head 110 by screws 112 which pass through both the ring 111 and block 108. The cross head 110 (Figure 6) has enlarged outer ends which are bored as at 113 to slightly engage vertical guide rods or posts 114, the upper ends of which are seated in sockets 115 in the press head 31. The guide rods 114 are held in the socket 115 by flanged portions 116 bolted as at 117 to the lower surface of the press head 31. The upper tubular punch 17 is flanged (Figure 2) and held in position against the lower surface of the cross head 110 by a retaining ring 118 bolted thereto as at 119 The punch 17 is provided with a central bore 120 of a diameter suitable for snugly but slidably receiving the upper end of the core rod 20. The outer diameter of the punch 17 is of a suitable diameter to snugly but slidably fit the mold bore 19.

*Lower plunger unit construction*

The lower plunger unit includes a lower cylinder 125 (Figure 3) having an outwardly extending flange portion 126 which is secured as by the bolts 127a to the press base 30. The flange 126 contains a threaded port or passageway 127 leading to an outer cylinder bore 128 closed at its outer or lower end by a cylinder head 129 bolted as at 130a to the end of the cylinder 125. The cylinder head 129 also has a threaded port or passageway 130 which, along with the port or passageway 127, is connected to the service lines or pipes from a four-way valve or a reversible hydraulic pump so that pressure fluid may alternately be supplied to one port while the other port is connected to a suction or discharge line, in accordance with conventional hydraulic practice. The head 129 is bored centrally as at 131 (Figure 3) to receive a compound fluid conduit generally designated 132 which is enlarged as at 133 at its outer or lower end and secured as at 134 to the cylinder head 129. The compound conduit 132 consists of an inner long pipe 134 and an outer short pipe 135 coaxial with one another and providing inner and outer fluid passageways 136 and 137 respectively. The inner and outer passageways 136 and 137 lead respectively to threaded external ports 138 and 139, respectively, both located in the enlarged portion 133 of the compound conduit 132.

Reciprocably mounted in the outer cylinder bore 128 is a hollow outer lower plunger generally designated 140 having a piston head 41 and a reduced diameter hollow piston rod 142 leading through a reduced diameter bore 143 coaxial with the outer cylinder bore 128 to the open air. A packing 144 prevents leakage around the hollow piston rod 142. The piston head 140 contains a stepped bore or opening 145 in which is secured, as by the bolts 146, an annular insert 147 having a central bore 148 snugly but slidably fitting the outside of the outer conduit 135. Packings 149 prevent leakage along the bore 148. The stepped bore 145 opens into a bore 150 located within the piston rod 142, the outer conduit 135 terminating at its upper end inside the bore 150. In order to limit upward the stroke of the lower outer plunger 140, the outer cylinder bore 128 above the piston head 141 is provided with projections or bosses 152 extending radially inward (Figure 4) and separated from one another by grooves 153. In this manner, the bosses or projections 152 serve as stops for limiting the upward stroke of the plunger 140 by engaging the annular shoulder 154 thereon when the piston head 141 has reached its maximum raised position.

Reciprocably mounted in the inner cylinder bore 150 within the hollow lower outer plunger 140 is a hollow lower inner plunger, generally designated 155 having a piston head 156 and a hollow piston rod 157 with a cavity 158 inside it and ports 159 running from the cavity 158 to the bore 150 behind the piston head 156. The piston head 156 is provided with a central bore 160 through which the inner conduit 134 passes and snugly engages, a packing 161 preventing leakage therebetween. The annular shoulder 162 on the upper side of the piston head 156 serves as a stop surface engageable with the annular surface 163 at the upper end of the inner cylinder bore 150. The upper end of the inner conduit 134 opens into the cavity 158 within the piston rod 157 of the lower inner plunger 155 so as to supply or discharge pressure fluid.

The upper end of the piston rod 157 is provided with an inwardly and downwardly extending threaded bore or socket 164 into which is threaded a screw shaft 165, the plain portion 166 of which passes through a bore 167 in a closure plate 168 and is enlarged at 169 at its upper end. Bolted or otherwise secured to the enlarged upper end 169 is a worm wheel 170 which is rotated by a worm 171 which is keyed or otherwise suitably secured to a shaft 172 (Figure 3) journaled at its opposite ends in the annular outer end 174 of a bracket 175, the hub 176 of which is bored as at 177 to slidably receive and engage one of the strain rods 34. The outer end of the shaft 172 is squared as at 178 (Figure 1) to receive a hand crank (not shown) by which it may be rotated. The rotation of the shaft 172 and its worm 171 consequently rotates the worm wheel 170 and screw shaft 165. Since the head 169 thereof is confined between the closure plate 168 and the base 179 of a lower punch supporting structure, generally designated 180 which is bolted to the upper side of the bracket outer end 174, the head 169 cannot move in either direction. Consequently, the lower punch support 180 rises and causes the closure plate 168 to move upward away from the upper end 181 of an externally threaded sleeve 182. The sleeve 182 has a bore 183 therein snugly but rotatably fitting the piston rod 157 and is rotated by a handle 184 in order to thread it into or out of a threaded bore 185 in the upper end 186 of the outer lower piston rod 142. A set screw 186a locks the sleeve 182 in its adjusted position. The piston rod 142 in turn is threaded externally as at 187 and is engaged by an internally threaded lock ring 188 rotated by a handle 189 secured thereto and also by an internally threaded ring nut or stop ring 190 rotated by a handle 191 secured thereto (Figure 3). The nut 190 is provided with a skirt or sleeve 192 (Figures 3 and 8) which has a beveled graduated lower edge portion 193 cooperating with a graduated vertical scale 194 to show the amount by which the nut 190 is rotated and consequently to show the amount by which the piston head 140 is lowered in the cylinder bore 128 at the lower end of its stroke. The stop ring 190 engages the upper end 195 of a stop sleeve 196, the lower end of which is flanged as at 197 and bolted to the upper end of the lower outer cylinder 125. The hollow piston rod 142 is keyed as at 197a to the stop sleeve 196, to permit sliding while preventing relative rotation.

The lower punch supporting structure 180 in addition to the base 179 includes four uprights or posts 198 which at their upper ends carry a platform 199 having a central aperture 200 for the passage of the core rod 20 (Figure 1). The lower end of the core rod 20 is threaded into a bore 201 in the bridge 21 so as to be firmly and immovably anchored therein. The lower punch 18 is flanged and secured to the platform 199 by a ring 202 bolted or otherwise secured thereto (Figure 1). The mold or die 16 is inserted in a bore 203 of a stepped sleeve 204 (Figure 1) which, in turn, is inserted in a bore 205 in the mold or die table 38.

Adjustments before operation

Prior to operating the press 10, various adjustments are made in order to adapt the press to the production of the particular workpiece which is to be made. The hand wheel 88 is rotated in one direction or the other to raise or lower the threaded stop 68 so as to limit the upward motion of the upper plunger 63 (Figure 2). The screw shaft 98 is rotated by applying a wrench to the hexagonal portion 104 after loosening the bolts 103 in order to release the split clamping nut 93, thereby enabling the cross head 110 to be raised or lowered relatively to the plunger 63 and consequently to raise or lower the upper tubular punch 17 to the desired height.

The uppermost knob or handle 184 (Figure 3) is used to rotate the threaded sleeve 182 in order to raise or lower its abutment end 181 and thus limit the downward stroke of the inner plunger 155 relatively to the outer plunger 140. The middle handle 189 is used to rotate the threaded locking ring 188 to enable the operator to rotate the threaded stop ring 190 by means of the handle 191, in order to limit the downward stroke of the outer piston 140. Thus, the operator lowers the outer piston 140 in order to obtain a longer stroke, since the upward stroke of the outer piston 140 is limited by the shoulders or bosses 152. Similarly, the upward stroke of the inner piston 155 is limited by the engagement of the upper side of the inner piston head 156 with the shoulder at the upper end of the inner cylinder bore 150. The extent to which the stroke of the outer plunger 140 is lengthened or shortened is indicated by the micrometer scales 193 and 194 (Figure 8).

In order to adjust the height of the lower outer tubular punch 18, the operator applies a wrench to the square shaft 178 on the outer end of the worm shaft 172, rotating the worm 171 (Figure 3) and consequently the worm wheel 170 so as to rotate the screw shaft 165 upward or downward within the threaded bore 164 at the upper end of the plunger rod 157 of the inner plunger 155. This action raises or lowers the entire lower punch supporting structure 180 bodily relatively to the lower inner plunger 155, together with the bracket 175. The core rod 20 is adjusted during the original assembly of the press and is afterward held in fixed position.

In this manner, the making of the foregoing adjustments determines accurately the distances to which the upper and lower punches 17 and 18 approach one another and consequently determine the exact size of the molded workpiece. These adjustments are unyielding, except at the will of the operator, hence workpieces cannot vary in dimensions as a result of defects in electrical control systems or failure of controls, as in prior types of presses. The adjustments of the press of the present invention are purely mechanical and absolutely positive as is apparent from the construction.

The press 10 is, of course, connected to a conventional hydraulic circuit employing either a conventional reversible hydraulic pump of a conventional four-way valve, which in turn is connected to a hydraulic pump. The word "hydraulic" is, of course, intended to include any pressure liquid operated pump and circuit and not merely one operated by water, since, of course, oil is actually used as the working fluid in many hydraulic pump circuits. When so connected, the ports 127 and 130 (Figure 3) become the service ports of the lower outer plunger 140, the ports 132 and 133 become the service ports for the lower inner plunger 155, and the ports 73 and 74 (Figure 2) become the service ports for the upper hydraulic plunger 63. In operation, the supplying of pressure fluid to one port of each pair and the connection of the other port of the pair to the suction side of the pump causes the plunger to travel in one direction as well as the reversal of the supply of pressure fluid causes the plunger to travel in the opposite direction.

In order to supply the die cavity 19 with powdered metal or other powdered material for the molding operation, a conventional feeding chute or shoe (not shown) is slidably mounted on the top of the table 38 so as to move back and forth beneath the upper punch 17 and over the mouth of the die cavity or bore 19. Such feeding chutes are well known in the powder metallurgy art and require no detailed description.

Operation

Figure 9:
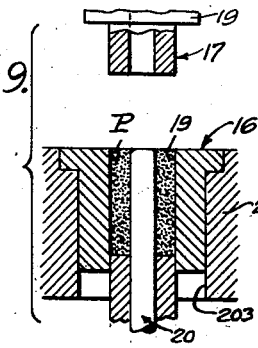
Figure 9 is a diagrammatic central vertical section through the central portion of the press showing the positions of the punches and mold or die at the conclusion of the mold filling operation.
Figure 13:
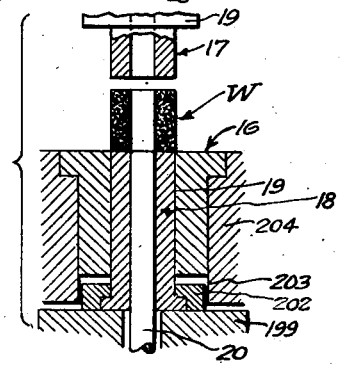
Figure 13 is a view similar to Figure 12, but showing the lower punch advanced still further upward to eject the molded workpiece.

With the various elements of the press 10 lined up and adjusted for the production of the particular workpiece, for example the bearing bushing W shown in Figure 13, the operator retracts the upper punch 17 to the position shown in Figures 1 and 9 by supplying pressure fluid to the lower port 74 (Figure 2) of the upper hydraulic cylinder 50 and discharging fluid from the upper port 73 thereof. The lower punch 18 is placed in the position shown in Figures 1 and 9, closing the lower end of the mold bore or die cavity 19 with the outer and inner plungers 140 and 155 at their lowermost positions, as regulated by the outer and inner stop members 196 and 182 respectively (Figure 3).

Figure 10:
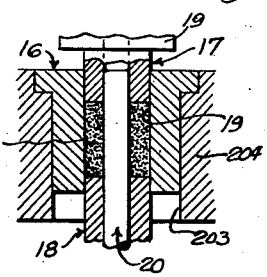
Figure 10 is a view similar to Figure 9, but showing the mold cavity closed by the downward motion of the upper punch.

The parts now occupy the position shown in Figures 1 and 9, the core rod 20 of course being stationary with its upper end flush with the top of the die or mold 16. The operator then operates the filling mechanism (not shown) to fill the die cavity or mold bore 19 with powdered metal or other powdered material, such as powdered iron or bronze, the charge P of powdered metal filling the mold cavity. The operator now supplies pressure fluid to the upper port 73 of the upper hydraulic cylinder 50, and discharges fluid from the lower port 74 thereof, causing the upper plunger 63 to descend, thereby causing the upper punch 17 to enter the mold cavity 19 and close the upper end thereof, the upper end of the core rod 20 entering the central bore of the punch 17 (Figure 10). In this position, the lower annular shoulder 65 beneath the piston head 64 of the upper plunger 63 engages the radial bosses 58 within the cylinder 50 (Figure 2) and halts the plunger 63 and upper punch 17 in a predetermined position.

Figure 11:
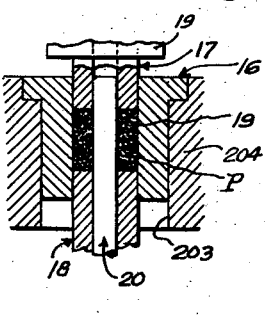
Figure 11 is a view similar to Figure 10 but showing the lower punch advanced to complete the molding operation.

The operator now supplies pressure fluid to the lower outer port 130 of the lower hydraulic cylinder 125 and discharges fluid from the upper outer port 127 thereof (Figure 3), causing the lower outer plunger 140 to rise until the annular surface 154 on its piston head 141 engages the radial stop bosses 152 (Figures 3 and 4), halting the upward motion of the lower outer plunger 140. Meanwhile, this has caused the lower punch 18 to move upward in the die cavity 19 (Figure 11), compressing the powdered material P into the size desired for the final workpiece W.

Figure 12:
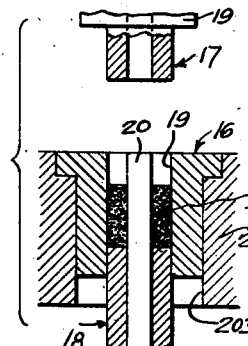
Figure 12 is a view similar to Figure 11 but showing the upper punch retracted to permit ejection of the molded article.

The operator now supplies pressure fluid to the lower port 74 in the upper hydraulic cylinder 50 and discharges fluid from the upper port 73 so as to cause the upper plunger 63 and upper punch 17 to rise and be retracted, halting when the recessed top surface 66 of the piston head 64 engages the lower end 67 of the threaded stop 68, whereupon the upper plunger 63 and the upper punch 17 halt. The parts now occupy the positions shown in Figure 12.

To eject the finished workpiece W, the operator now supplies pressure fluid to the lower port 139 and connects the lower port 138 of the conduit structure 132 to discharge fluid. Pressure fluid flows upward into the space beneath the lower inner plunger 155, causing the latter to rise until the annular shoulder 162 on the upper side of the piston head 156 engages the annular surface 163 at the upper end of the inner cylinder bore 150 (Figure 3). This action causes the lower punch supporting structure 180 and the lower punch 18 to rise still further while the outer plunger 140 is halted against its stops, ejecting the molded workpiece W from the die cavity 19 (Figure 13). The workpiece W may then be removed to a sintering oven and sintered in the usual manner. The outer and inner plungers 140 and 155 are then retracted by reversing the foregoing procedure and supplying pressure fluid to the ports 127 and 138 respectively (Figure 3), returning the outer and inner plungers 140 and 155 to their lowermost positions shown in Figures 1 and 3, with the plate 168 engaging the upper end 181 of the threaded sleeve 182 as a stop. The parts have now returned to the positions shown in Figure 9, and the die cavity 19 is refilled with powdered material and the foregoing operations repeated.

What I claim is:

1. A compound hydraulic motor comprising a cylinder having an outer cylinder bore therein, a tubular outer plunger reciprocably mounted in said outer cylinder bore and having a threaded portion disposed externally of said cylinder, a work element connected to said tubular plunger, a stop abutment member stationarily mounted adjacent said threaded plunger portion, a threaded stop member threaded upon said threaded plunger portion and abuttingly engageable with said abutment member at a predetermined location in the stroke of said tubular plunger, said tubular plunger having an inner cylinder bore therein, an inner plunger reciprocably mounted in said inner cylinder bore and extending through said tubular plunger and having a threaded portion disposed outwardly of said tubular plunger, said work element having a threaded portion threadedly and adjustably engaging said inner plunger portion, and a fluid conduit structure extending into said cylinder bore and through said tubular plunger into said inner cylinder bore, said inner plunger having a chamber therein communicating with said inner cylinder bore, and said conduit structure having a portion thereof extending through said inner plunger into said chamber.

2. A compound hydraulic motor comprising a cylinder having an outer cylinder bore therein, a tubular outer plunger reciprocably mounted in said outer cylinder bore and having a threaded portion disposed externally of said cylinder, a work element connected to said second plunger, a stop abutment member stationarily mounted adjacent said threaded plunger portion, a threaded stop member threaded upon said threaded plunger portion and abuttingly engageable with said abutment member at a predetermined location in the stroke of said tubular plunger, said tubular plunger having an inner cylinder bore therein, an inner plunger reciprocably mounted in said inner cylinder bore and extending through said tubular plunger and having a threaded portion disposed outwardly of said tubular plunger, said work element having a threaded portion threadedly and adjustably engaging said inner plunger portion, and a fluid conduit structure extending into said cylinder bore and through said tubular plunger into said inner cylinder bore, said inner plunger having a chamber therein communicating with said inner cylinder bore, said conduit structure having a fluid passageway therethrough opening into said cylinder bore and a portion thereof extending through said inner plunger into said chamber and having a separate fluid passageway through said extending portion and opening into said chamber.

3. A compound hydraulic motor comprising a cylinder having a cylinder bore therein, a plunger reciprocably mounted in said cylinder bore and having a threaded portion disposed externally of said cylinder and coaxial with said cylinder bore, a stop abutment member stationarily mounted adjacent said threaded plunger portion, a threaded stop member threaded upon said threaded plunger portion and coaxial therewith, said threaded stop member being abuttingly engageable with said abutment member at a predetermined location in the stroke of said plunger, said plunger having a work element receiving portion, and a work element carried by said work element receiving portion and extending outwardly from said cylinder beyond said threaded plunger portion and stop member.

4. A compound hydraulic motor comprising a cylinder having an outer cylinder bore therein, an outer tubular plunger reciprocably mounted in said outer cylinder bore, a work element connected to said tubular plunger, said outer plunger having an inner cylinder bore, an inner plunger reciprocably mounted in said inner cylinder bore and extending through said tubular plunger and having a threaded portion disposed outwardly of said tubular plunger, said work element having a threaded portion threadedly and adjustably engaging said inner plunger portion, and a fluid conduit structure extending into said cylinder bore and through said tubular plunger into said inner cylinder bore.

5. A compound hydraulic motor comprising a cylinder having an outer cylinder bore therein, an outer tubular plunger reciprocably mounted in said outer cylinder bore and having a threaded portion disposed externally of said cylinder and coaxial with said outer cylinder bore, a stop abutment member stationarily mounted adjacent said threaded plunger portion and a threaded stop member threaded upon said threaded plunger portion and coaxial therewith, said threaded stop member being abuttingly engageable with said abutment member at a predetermined location in the stroke of said tubular plunger, said outer plunger having an inner cylinder bore, an inner plunger reciprocably mounted in said inner cylinder bore and having a portion extending outwardly through said tubular outer plunger, a work element mounted upon said inner plunger externally of said sleeve, and a fluid conduit structure extending into said cylinder and through said tubular plunger into said inner cylinder bore.

6. A compound hydraulic motor comprising a cylinder having an outer cylinder bore therein, an outer tubular plunger reciprocably mounted in said outer cylinder bore and having a threaded portion disposed externally of said cylinder and coaxial with said outer cylinder bore, a stop abutment member stationarily mounted adjacent said threaded plunger portion and a threaded stop member threaded upon said threaded plunger portion and coaxial therewith, said threaded stop member being abuttingly engageable with said abutment member at a predetermined location in the stroke of said tubular plunger, said outer plunger having an inner cylinder bore and also an internally-threaded bore at the outer end thereof, an externally threaded stop sleeve threaded into said internally threaded bore, an inner plunger reciprocably mounted in said inner cylinder bore and having a portion extending outwardly through said tubular outer plunger and through said stop sleeve, a work element mounted upon said inner plunger externally of said sleeve and abuttingly engageable with said sleeve at a predetermined location in the stroke of said inner plunger, and a fluid conduit structure extending into said cylinder and through said tubular plunger into said inner cylinder bore.

JOHN HALLER.

References Cited in the file of this patent

UNITED STATES PATENTS

| Number | Name | Date |
|---|---|---|
| 994,349 | Updegraff | June 6, 1911 |
| 1,667,673 | Peirson et al. | Apr. 24, 1928 |
| 1,679,408 | Davis et al. | Aug. 7, 1928 |
| 1,820,235 | Lemming et al. | Aug. 25, 1931 |
| 1,920,979 | Fraser | Aug. 8, 1933 |
| 2,232,180 | Kux | Feb. 18, 1941 |
| 2,398,227 | Hubbert | Apr. 9, 1946 |
| 2,499,930 | Stokes et al. | Mar. 7, 1950 |